US005985376A

United States Patent [19]
Kamen

[11] Patent Number: 5,985,376
[45] **Date of Patent: *Nov. 16, 1999**

[54] APPARATUS AND METHOD FOR SCREEN PRINTING RADIATION CURABLE COMPOSITIONS

[75] Inventor: Melvin Edwin Kamen, Highlands, N.J.

[73] Assignee: Revlon Consumer Products Corporation, New York, N.Y.

[ * ] Notice: This patent is subject to a terminal disclaimer.

[21] Appl. No.: 08/432,485

[22] Filed: May 1, 1995

[51] Int. Cl.[6] .......... C08J 7/04

[52] U.S. Cl. .......... 427/504; 118/58; 427/266; 427/269; 427/287; 427/385.5; 427/389.7; 427/428; 427/510; 427/511; 427/552; 427/558; 427/559

[58] Field of Search .......... 427/504, 510, 427/511, 552, 558, 559, 266, 269, 287, 385.5, 389.7, 428; 118/58

[56] References Cited

U.S. PATENT DOCUMENTS

| | | | |
|---|---|---|---|
| 3,960,081 | 6/1976 | Gustavs | 101/416 A |
| 4,050,412 | 9/1977 | Bautz | 118/642 |
| 4,235,579 | 11/1980 | Kurz | 425/174.4 |
| 4,592,276 | 6/1986 | Dubuit | 101/38 A |
| 4,813,351 | 3/1989 | Pierson | 101/115 |
| 4,836,102 | 6/1989 | Cicci | 101/41 |
| 5,115,471 | 5/1992 | Rodi | 101/424.1 |
| 5,142,975 | 9/1992 | Podalsky | 101/40.1 |
| 5,313,882 | 5/1994 | Karlyn | 101/126 |
| 5,335,594 | 8/1994 | Karlyn | 101/38 |

OTHER PUBLICATIONS

U.S. Serial No. 432,482, filed May 1, 1995.
American Ink Malun, Jul. 1994, pp. 43–45.

*Primary Examiner*—Bernard Pianalto
*Attorney, Agent, or Firm*—Julie Blackburn

[57] ABSTRACT

An apparatus and method enables screen printing various articles such as glassware with a radiation curable composition using, for example, UV radiation and the like in pre-existing screen printing decorating equipment having a plurality of screen printing workstations. Particularly suitable compositions are those which are environmentally safe by virtue of being free of toxic heavy metals and volatile organic compounds. The applied inked image is at least partially cured at each screen printing workstation to form a skin on the surface of the transferred image of sufficient strength to support the next layer to be applied. The UV radiation may emanate opposing and underlying each of the screen printing workstations were brought thereto from a remotely positioned laser via a fiber optic bundle or light pipe.

52 Claims, 6 Drawing Sheets

| INTERVAL (nm) | POWER WATTS | POWER ACCUM |
|---|---|---|
| 201-250 | 67.0 | 67 |
| 251-300 | 179.4 | 246 |
| 301-350 | 222.7 | 469 |
| 351-400 | 662.7 | 1132 |
| 401-450 | 349.1 | 1481 |
| 451-500 | 66.4 | 1547 |
| 501-550 | 161.0 | 1708 |
| 551-600 | 55.7 | 1764 |
| 601-650 | 20.8 | 1785 |
| 651-700 | 11.6 | 1796 |
| 701-750 | 12.0 | 1808 |
| 751-800 | 13.2 | 1822 |
| 801-850 | 12.8 | 1834 |
| 851-880 | 2.2 | 1837 |

APPARATUS AND METHOD FOR SCREEN PRINTING RADIATION CURABLE COMPOSITIONS

BACKGROUND OF THE INVENTION

The present invention relates in general to the glass decorating technology of screen printing radiation curable compositions onto glass substrates, e.g., glassware, in various predetermined patterns and registrations, which compositions are environmentally safe by virtue of being free of toxic heavy metals and volatile organic compounds ("VOC"). Still more particularly, the present invention is directed to an apparatus and method for decorative screen printing various glassware with such a composition curable using ultraviolet radiation ("UV") and the like in preexisting screen printing decorating equipment modified in accordance with the present invention.

In the glassware decorating industry there exists the desire to apply multiple registered layers which frequently overlap one another for decorative and other purposes. To overprint one layer with another, the art has recognized the use of hot melt ceramic printing inks which solidify sufficiently between printing stations to enable overprinting with the next layer of the printing ink without the adverse consequences of streaking and the like of the previously applied layer. However, it is known in addition to this process being relatively slow, that these printing inks contain undesirable toxic heavy metals and volatile organic compounds such as solvents which have been made the subject of increased environmental regulation. Consequently, the glassware decorating industry has sought to replace these ceramic printing inks containing VOC's and toxic heavy metals with pigmented UV curable pigmented compositions which are environmentally safe. See UV Inks Move Into the Light, David Aynessazian, American Ink Maker, pp. 43–45, July 1994.

To this end, there is known from U.S. patent application Ser. Nos. 199,414 and 199,415 now U.S. Pat. Nos. 5,571,359 and 5,487,927 respectively, both filed on Feb. 22, 1994 and assigned to the same assignee of the present application, pigmented UV curable compositions which are free of VOC's and toxic heavy metals suitable for decorating glass substrates, thereby rendering them environmentally safe. Notwithstanding the existence of these novel compositions, known screen printing decorating equipment available for applying multiple overlapping layers in registration with one another have been designed to accommodate the use of hot melt ceramic printing inks which enable their solidification between adjacent printing stations.

Because of the significant costs involved in the design and purchase of new screen printing decorating equipment, it would be desirable to retrofit existing equipment for use with these novel UV curable compositions. Unfortunately, the current equipment are not designed to accommodate a UV curing workstation subsequent to the next screen printing station in order to cure the composition after it has been applied. This problem becomes especially acute with multiple color printing processes in which multiple separate color images must be sequentially applied, often in registration with one another, by separate printing screens requiring a curing step after each image application.

Accordingly, there is an unsolved need for a screen printing decorating equipment which has been adapted to accommodate a UV curing workstation and method therefore to accommodate the printing of multiple registered images with UV curable compositions which are environmentally safe by being free of toxic heavy metals and VOC's.

SUMMARY OF THE INVENTION

One object of the present invention is to provide an apparatus and method for applying radiation curable compositions in decorating glassware and the like.

Another object of the present invention is to provide an apparatus and method which avoids the need for using hot melt ceramic printing inks when decorating glassware and the like with multiple layers which are at least partially in registration with one another.

Another object of the present invention is to provide an apparatus and method for screen printing various articles such as glassware with a radiation curable composition using, for example, UV radiation and the like, in preexisting screen printing decorating equipment having a plurality of screen printing workstations.

Another object of the present invention is to provide an apparatus and method for partially curing UV radiation curable compositions by controlling exposure through distance, power, time, wavelength, UV filters, the use of photo initiators, etc.

The present invention solves the aforementioned unsolved needs and objects by positioning a UV source opposing the printing, screen at each screen printing workstation. The glass article to be decorated is positioned between the UV source and the printing screen. Each article is printed with an image formed from the UV curable composition by being rolled across the printing screen. The UV source is positioned so that as the applied image is transferred to the article, UV radiation is incident upon the article surface as it rolls away from the printing screen with the newly transferred image. The image is exposed to the UV radiation for a sufficient duration such that a cured skin forms on the surface of the transferred image of sufficient strength to support the next layer to be applied to the article. It is also contemplated that the UV source may be positioned remote from the screen printing workstation. In this regard, the UV radiation may be brought to a location opposing each printing screen using a light pipe, a fiber optic bundle or the like.

UV sources are positioned at or brought to each printing screen in a manner that permits at least partial curing of the applied image transferred to the article with substantially no curing of the radiation curable composition contained on the printing screen. In particular, when the article is an item of glassware, the UV source is positioned so that the glass substrate, as it is being printed, filters out about 90% of the UV radiation that would otherwise be incident upon the printing screen. A separate control device may optionally be utilized so that the UV source is turned off when there is no glass substrate in position to filter the UV radiation. In addition, the UV source may optionally be positioned so that the UV radiation emitted is at an energy level of reduced power with respect to the printing screen such that any incident radiation that is not filtered by the glass substrate is not of sufficient intensity to cure the radiation curable composition on the printing screen. A partial UV filter may also be used for this purpose.

Once all multiple colors of the composition have been transferred to the article, the article is advanced to a final UV curing station for a thorough curing of the composite image. The present invention allows for the retrofitting of conventional preexisting screen printing decorating equipment for use with pigmented UV radiation curable compositions with a minimum expenditure of capital.

In accordance with one embodiment of the present invention, there is disclosed and described an apparatus for applying a layer of radiation curable material onto the surface of an article, the apparatus comprising a frame assembly having at least first and second material applying stations, applying means for applying a layer of radiation curable material onto the surface of the article at the first and second stations, radiation emitting means positioned underlying the applying means at the stations for at least partially curing the layer of material thereat, and means for conveying the article into operative relationship with the applying means and the radiation emitting means at the first and second stations.

In another embodiment of the present invention there is disclosed and described an apparatus for screen printing an article with a layer of radiation curable material, the apparatus including a plurality of screen printing workstations each having a screen printing assembly for applying the radiation curable material to the article, wherein the improvement comprises radiation emitting means positioned underlying the screen printing assemblies for at least partially curing the radiation curable material applied to the article.

In another embodiment of the present invention there is disclosed and described an apparatus for applying a layer of radiation curable material onto the surface of an article, the apparatus comprising a frame assembly having at least first and second material applying stations, applying means for applying a layer of radiation curable material onto the surface of the article at the first and second stations, radiation emitting means for at least partially curing the layer of material positioned at a remote location from the applying means, conducting means for conducting radiation emitted from the source to the stations adjacent the applying means, and means for conveying the article into operative relationship with the applying means and the radiation emitted from the source at the first and second stations.

In accordance with another embodiment of the present invention there is disclosed and described an apparatus for screen printing multiple layers of a UV curable composition onto the surface of an article, the apparatus comprising a frame assembly having a plurality of screen printing workstations, a screen printing assembly located at each of the workstations for applying a layer of the composition to the surface of the article, at least one layer of the composition applied at least partially overlying another layer of the composition, UV radiation emitting means positioned underlying each of the screen printing assembly for exposing the layer of the composition to sufficient UV radiation for at least partially curing the composition, and means for conveying the article into operative association with the screen printing assemblies and the UV radiation.

In accordance with another embodiment of the present invention there is disclosed and described an apparatus for applying a layer of radiation curable material onto the surface of an article, the apparatus comprising a frame assembly having at least first and second material applying stations, applying means for applying a layer of radiation curable material onto the surface of the article at the first and second stations, radiation emitting means positioned adjacent the applying means at the stations for at least partially curing the layer of material thereat and insufficient to cure said radiation curable material within said applying means, and means for conveying the article into operative relationship with the applying means and the radiation emitting means at the first and second stations.

In accordance with another embodiment of the present invention there is disclosed and described a method of applying a layer of radiation curable material onto the surface of an article, the method comprising conveying an article through a plurality of printing workstations, applying a layer of radiation curable material onto the surface of the article at each of the workstations, and exposing the applied layer to radiation sufficient to at least partially cure the applied layer at a location underlying the printing workstations.

In accordance with another embodiment of the present invention there is disclosed and described a method of printing multiple layers of a UV curable composition onto the surface of an article, the method comprising conveying an article through a plurality of printing workstations, applying a layer of the composition onto the surface of the article at each of the workstations, at least one layer being applied partially overlapping a previously applied layer, exposing at least the previously applied layer at a location underlying its corresponding printing workstation to sufficient UV radiation to at least partially curing the previously applied layer and insufficient to cure said UV curable composition within said workstations.

BRIEF DESCRIPTION OF THE DRAWINGS

The above description, as well as further objects, features and advantages of the present invention will be more fully understood with reference to the following detailed description of an apparatus and method for screen printing UV curable pigmented compositions, when taken in conjunction with the accompanying drawings, wherein.

DETAILED DESCRIPTION OF THE PREFERRED EMBODIMENTS

Figure 1:
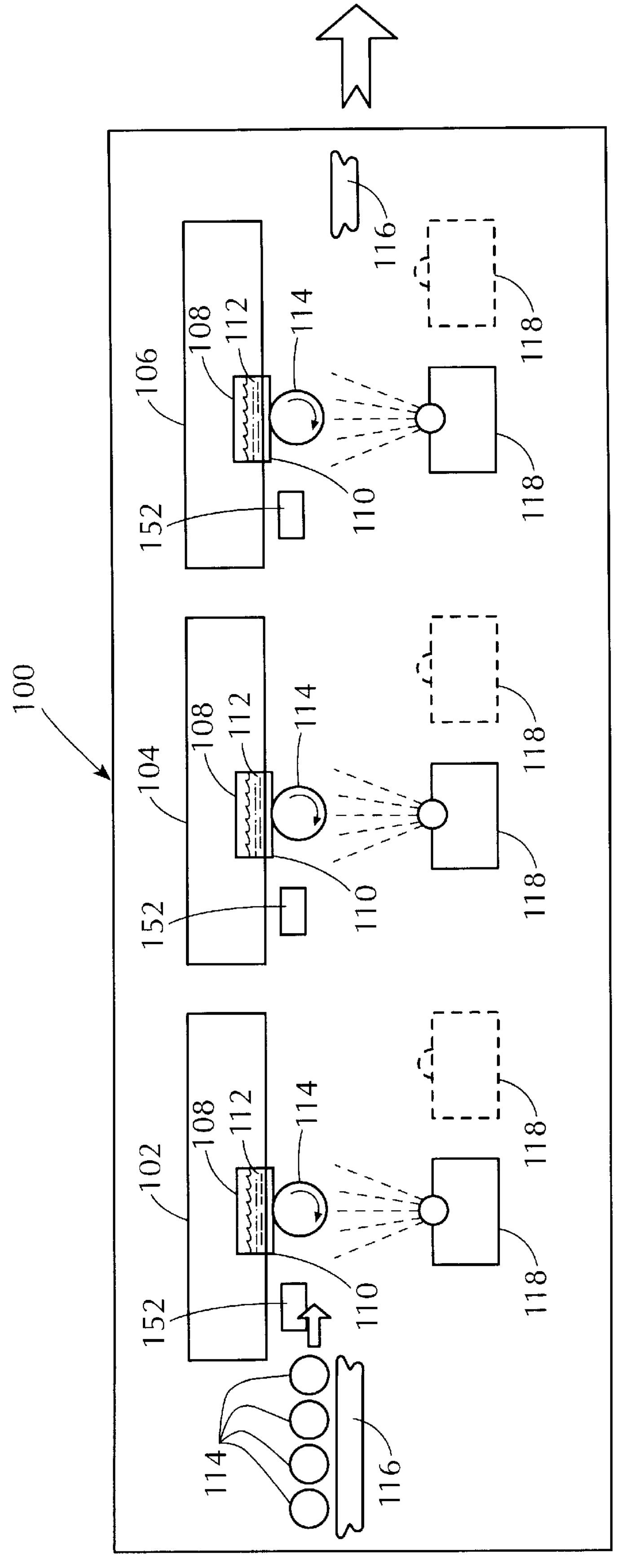
FIG. 1 is a diagrammatic illustration of an apparatus for screen printing UV curable pigmented compositions onto the surface of a substrate in accordance with one embodiment of the present invention.

Referring now to the drawings, wherein like reference numerals represent like elements, there is diagrammatically shown in FIG. 1 an apparatus generally designated by reference numeral 100 for decorating various articles with a radiation curable composition. The apparatus 100 and method of the present invention is particularly suitable for the glassware decorating industry where various glass substrates, e.g., glass bottles and the like, are decorated with multiple registered layers of the radiation curable composition. However, the apparatus and method of the present invention is also suitable for substrates other than glass, for example, plastic and ceramic, which may include containers such as bottles, cups, dishes, glasses, vases and other decorative glassware; and glass or ceramic sheets, figurines, tiles and the like.

Radiation curable compositions suitable for use in the present invention are described in the aforementioned U.S. patent application Ser. Nos. 199,414 and 199,415 now U.S. Pat. Nos. 5,571,359 and 5,487,927 respectively, which applications and compositions are incorporated herein by reference. In general, these radiation curable compositions contain a radiation curable component which may be monomers, oligomers, or low molecular weight homopolymers, copolymers, terpolymers, graft copolymers or block copolymers, so long as the component is cured (polymerized) by exposure to electron beam, actinic or ultraviolet radiation. The radiation curable component is capable, after curing, to bind to the substrate to which it is applied to a degree sufficient to be commercially acceptable for decorating purposes. This means that the composition must be permanently affixed to the substrate to a degree sufficient to remain on the substrate for the useful life of the substrate. For example, where the substrate is a container containing nail enamel, the composition must remain on the container throughout the useful life of the nail enamel and remain resistant to the solvents and other ingredients found in nail enamel. In the preferred composition, the radiation curable component is curable by ultraviolet radiation having a wavelength of 4 to 400 nm, and preferably 325 to 365 nm. In the case of actinic radiation, the radiation curable component is curable by actinic radiation having the wavelength of 4–600 nm.

The apparatus 100 includes a plurality of sequential screen printing workstations 102, 104, 106. Although only three workstations 102, 104, 106 have been illustrated, it is to be understood that any number may be provided within the apparatus 100. At each screen printing workstation 102, 104, 106, there is provided a screen printing head 108 having a printing screen 110 through which the radiation curable composition 112 is applied to an underlying article 114 by means of a squeegee device (not shown) The articles 114 to be decorated are transported through the apparatus 100 into registration with each of the screen printing heads 108 by means of a conveyor system 116. Each of the screen printing heads 108 is adapted to print an inked image of a color or texture the same or different than the images to be printed by the remaining screen printing heads. The inked images may be registered to provide different resulting patterns, for example, partially or fully overlapping one another when decorating an article. Suitable screen printing decorating equipment of the type as thus far described are known from Carl Strutz & Company, Inc. of Mars, Pa.

It can be appreciated that it is important to ensure that the inked image printed by one of the screen printing heads 108 is at least partially dried or cured before a second colored image is printed over the first image. Otherwise, interaction between the two differently colored inks may cause the colors to run or bleed, and the sharpness of the outline or contour of the composite image will be diminished. Furthermore, a portion of the ink which remains wet on the article 114 may adhere to the printing screen 110 of the next adjacent, downstream screen printing head 108, thereby causing further interaction of the inks as well as other related problems. At the same time, it is important to prevent curing of the ink within the screen printing heads 108 which might be exposed to the UV radiation during the partial curing process of the applied inked image.

In accordance with one embodiment of the present invention, the freshly applied outer surface of the inked image is at least partially cured by means of a UV radiation emitting source such as a UV lamp 118 located at or adjacent each of the screen printing workstations 102, 104, 106. Each of the UV lamps 118 is positioned generally underlying and opposing the printing screen 110 within the screen printing heads 108. Where the construction of the apparatus allows, the UV lamps 118 may be positioned in the space between and underlying the screen printing workstations 102, 104, 106 as shown in dashed lines in FIG. 1. As each article 114 is rotated away from the printing screen 110, the inked image is exposed to the UV radiation emitted from the underlying UV lamp 118 for a sufficient duration to at least partially cure the outer surface of the applied inked image. As previously noted, the radiation source may be other than UV radiation, for example, actinic radiation, electron beam, microwave radiation and/or infrared radiation supplied from a suitable source thereof.

Figure 2:
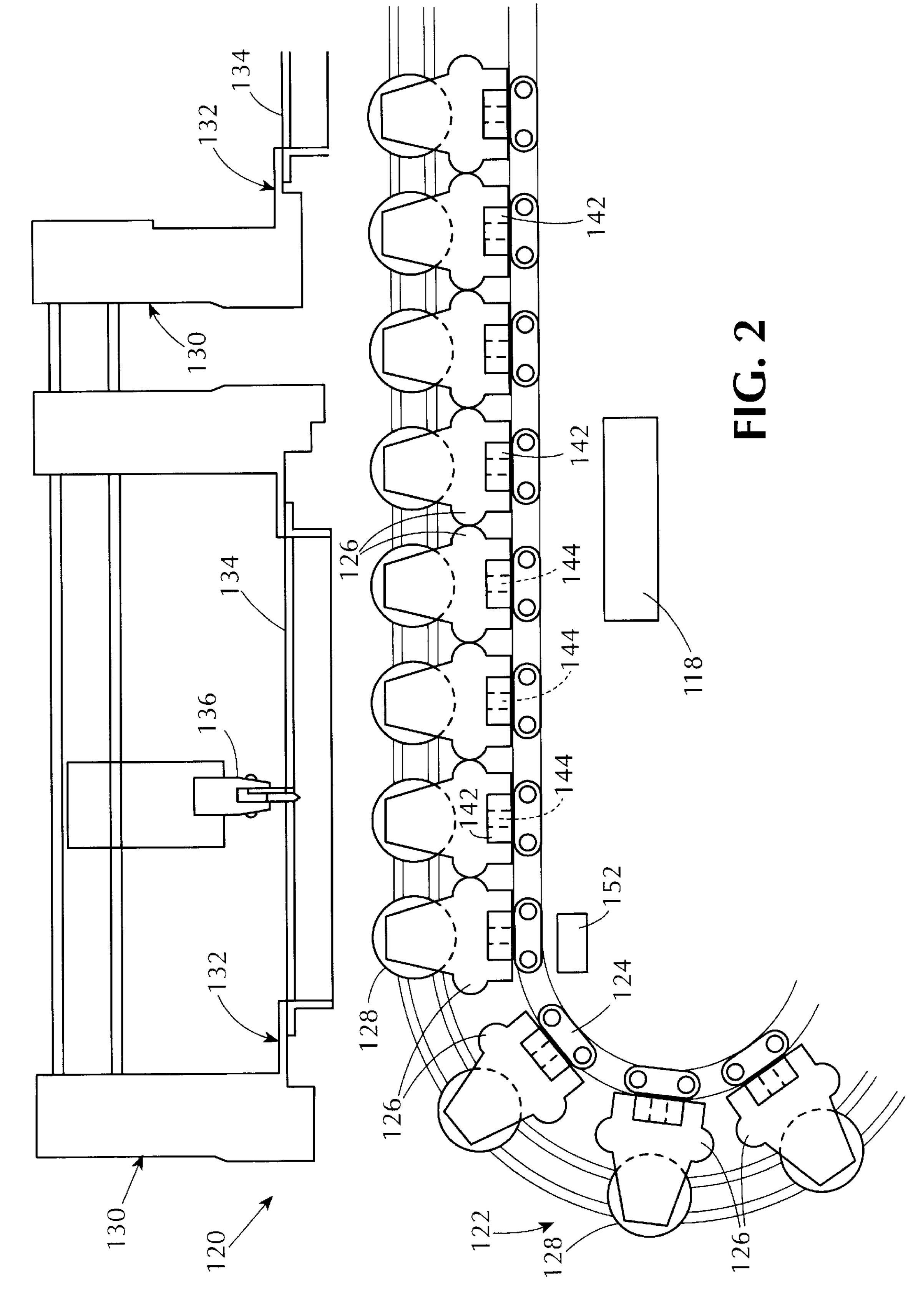
FIG. 2 is partial cross-sectional view of a screen printing apparatus retrofitted with a partial UV curing station in accordance with one embodiment of the present invention.
Figure 3:
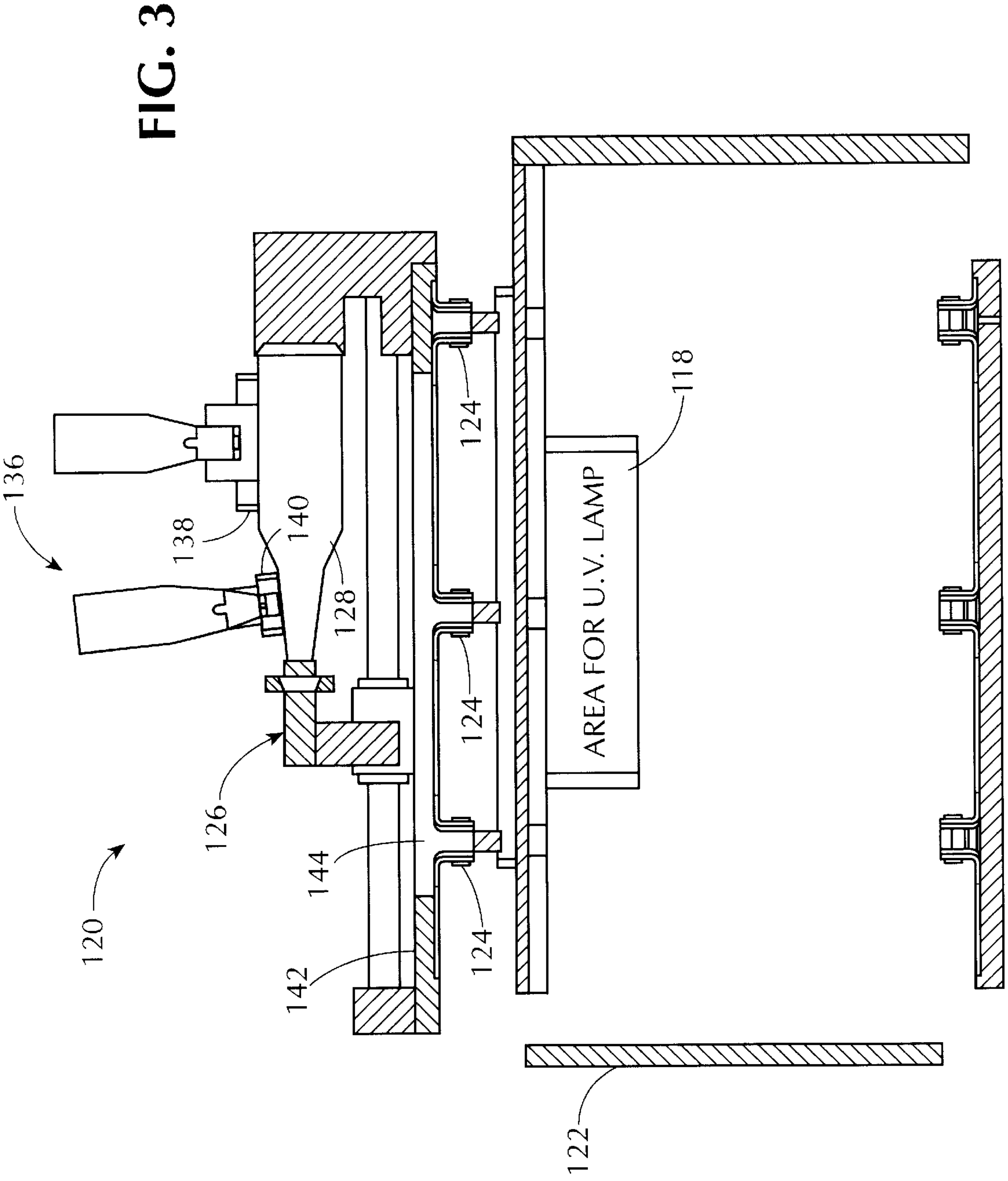
FIG. 3 is a partial cross-sectional view of the apparatus shown in FIG. 2.

The location of the UV lamp 118, by way of one example, in conjunction with an apparatus 100 commercially available from Carl Strutz & Company, Inc. is more particularly shown in FIGS. 2 and 3. The preexisting apparatus 120 is constructed to include a frame assembly 122 which supports three spaced apart continuous chain conveyors 124 each forming a continuous closed path. A plurality of glassware holders 126 are attached in adjacent relationship about the outer periphery of the conveyors 124 for continuous movement therewith. Each of the holders 126 is adapted for releasably securing, for example, a glass bottle 128 in a horizontal orientation with respect to its longitudinal axis. The bottles 128 are continuously conveyed underlying a plurality of adjacent screen printing workstations 130, each having a screen printing head 132 containing a printing screen 134 and squeegee assembly 136. The squeegee assembly 136, as better shown in FIG. 3, includes a pair of squeegees 138, 140, one adapted for screen printing the body portion of the bottle 128 and the other for the neck portion of the bottle. Each holder 126 includes a base plate 142 provided with a centrally disposed elongated opening 144.

A UV lamp 118 or other source of UV radiation such as a laser radiation device is positioned underlying each screen printing head 132 within the path of travel of the bottle holders 126 by means of the chain conveyors 124. In particular, by way of example, the UV lamps 118 are positioned underlying the central one of the chain conveyors 124. As each glass bottle 128 is rotated during the screen printing process at each screen printing workstation 130, the surface of applied inked image will be exposed to UV radiation projecting upwardly through opening 144 in the base plate 142 of the aligned holder 126. In this manner, the applied inked image may be at least partially cured prior to the bottle 128 being advanced to the next screen printing workstation 130.

As apparent from FIG. 2, there is generally insufficient space between adjacent screen printing workstations 130 above the chain conveyors 124 of the preexisting screen printing decorating equipment to enable retrofit placement of a UV lamp 118. On the other hand, there is typically sufficient room within the frame assembly 122 of the pre-existing equipment to position a UV lamp 118 underlying and opposing each of the screen printing heads 132, or between adjacent screen printing workstations 102, 104, 106. As a result, existing equipment which were designed for screen printing hot melt ceramic inks can be modified to accommodate the use of UV radiation curable compositions and the like with a minimum of expense and time.

In accordance with this arrangement, the UV radiation is directed upwardly towards the printing screen 134 which contains a supply of radiation curable composition 112. There is therefore the possibility of prematurely curing the composition which is contained within each screen printing head 132. However, the presence of the glass bottle 128 due to its material composition will filter out about 90% of the UV radiation that would otherwise be incident upon the printing screen 134. As such, the potential adverse consequences of the incident UV radiation are greatly minimized, if not eliminated.

Figure 4:
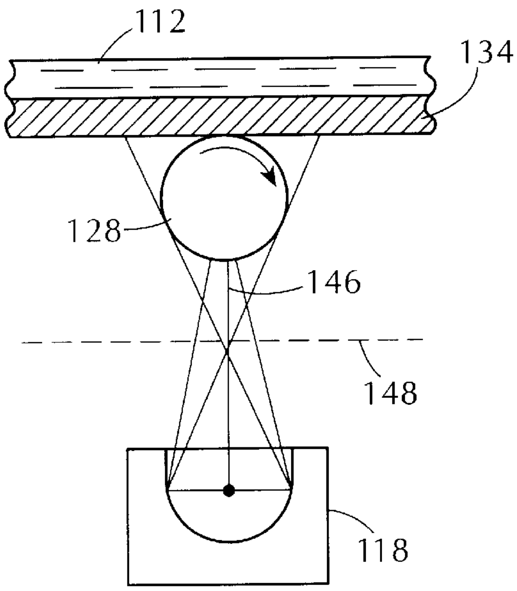
FIG. 4 is a diagrammatic illustration of an arrangement of a UV lamp for effecting partial curing of the screen printed radiation curable material in accordance with one embodiment of the present invention.
Figure 5:
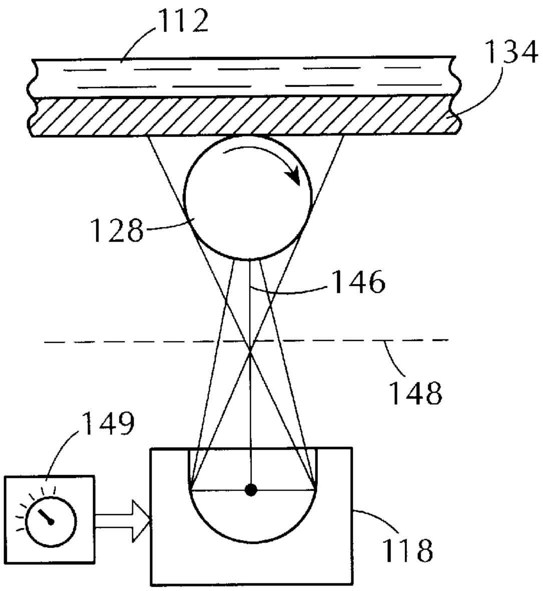
FIG. 5 is a diagrammatic illustration of an arrangement of a UV lamp for effecting partial curing of the screen printed radiation curable material in accordance with another embodiment of the present invention.

To provide insurances against any possible premature curing of the radiation curable composition within the screen printing heads 132, there is disclosed in FIGS. 4 and 5 two different arrangements for the UV lamp 118 in accordance with the present invention. As previously described, it is normally important to ensure that the inked image printed by one of the screen printing heads 132 is at least partially cured before a second image is printed over the first image. It is therefore not required that the inked image be completely cured at each screen printing head 132. As long as the applied inked image is at least partially cured, the inked image will not run or bleed and the sharpness of the outline or contour of the composite image will be preserved during subsequent screen printing of the next image at an adjacent screen printing head 132.

The applied inked image can be partially cured using the UV lamp 118 by controlling any one of a number of process variables. By only partially curing the applied inked image, this prevents any accidental curing of the radiation curable composition 112 within each screen printing head 132. Any incidental UV radiation to which each screen printing head 132 might be exposed will be insufficient to effect curing of the radiation curing composition 112 therein. For example, the UV lamp 118 may be operated at less than 100% power. In this regard, the output power of the UV lamp 118 may be regulated through a suitable voltage supply (not shown) to lower the power output to prevent full cure of the applied inked image. It is also known that the output power of the UV lamp 118 diminishes with distance. In this regard, the location of the applied inked image and hence each screen printing head 132 may be positioned sufficiently distant from the UV lamp 118 to also preclude full cure of the applied inked image and radiation curable composition 112. The total time of exposure of the applied inked image to the UV lamp 118 may also be controlled to preclude full curing thereof. This can be easily achieved by increasing the speed of operation of the apparatus 100, in particular, as the glass bottles 128 are transported from one screen printing workstation 102, 104, 106 to the next. The degree of curing of the applied inked image can also be controlled by interposing UV filters for selectively filtering the wavelength of the emitted UV light. It is also possible to add photo initiators into the radiation curable composition to slow down its curing speed. However, one object of the present invention is to increase the operating speed of the apparatus 100. Thus, it is less desirable to use photo initiators than the other aforementioned techniques for controlling the partial curing of the applied inked image.

As shown in FIG. 4, a partial cure of the applied inked image can be obtained by positioning the working surface of the glass bottle 128 carrying the inked image at a location which is not coincident with the location 148 of maximum power of the emitted UV radiation from the UV lamp 118. This may be referred to as an out of focus arrangement of the UV lamp 118. Notwithstanding the foregoing, the strength of the UV radiation falling on the applied inked image will still be sufficient to at least partially cure the inked image for further application of additional layers. The resulting incident UV radiation falling upon the printing screen 134 either directly or being filtered by the glass bottle 128 will be of such diminished intensity so as to preclude any premature curing of the radiation curable composition 112 within the screen printing head 132.

Referring to FIG. 5, a partial cure of the applied inked image can be obtained even though the location 148 of maximum power of the emitted UV radiation from the UV lamp 118 is coincident with the surface 146 of the applied inked image. Full curing of the applied inked image is prevented by decreasing the power of the emitted UV radiation by lowering the voltage from the power supply 149. The resulting incident UV radiation falling upon the printing screen 134 either directly or being filtered by the glass bottle 128 will be of such diminished intensity so as to preclude any premature curing of the radiation curable composition 112 within the screen printing head 132. Alternatively, the total time of exposure of the applied inked image to the UV radiation may also be controlled to prevent full curing. This can be achieved by increasing the speed of rotation of the glass bottle 128 and/or the speed of conveying same through and between each of the screen printing workstations 102, 104, 106.

Figure 6:
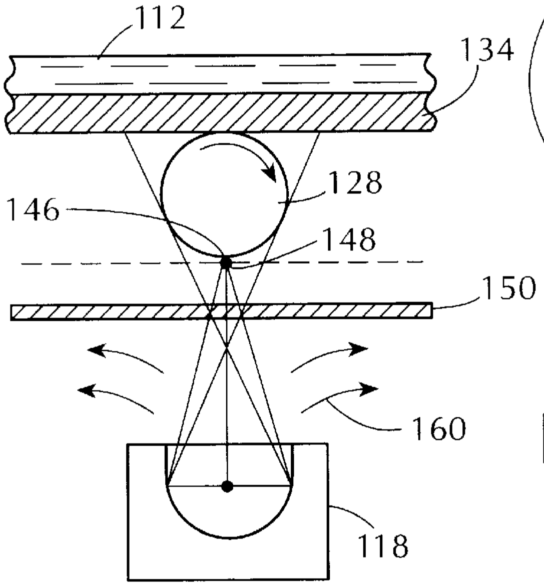
FIG. 6 is a diagrammatic illustration of an arrangement of a UV lamp for effecting partial curing of the screen printed radiation curable material in accordance with another embodiment of the present invention.
Figure 7:
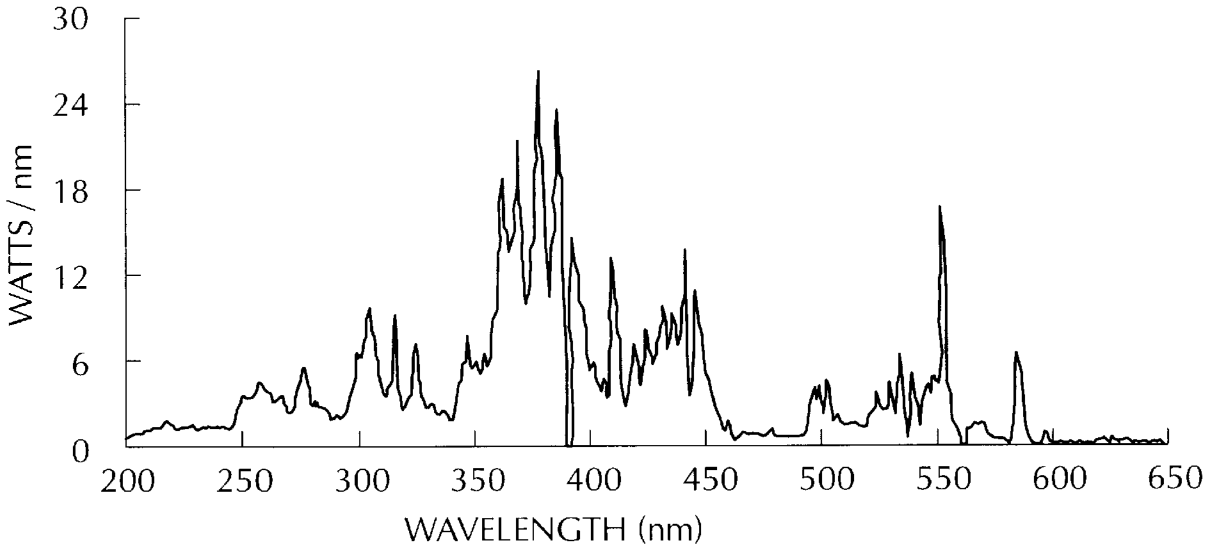
FIG. 7 is a table and graph of the spectral radiance of a ten inch D UV Bulb No. F-450, Series 4D-938.

In an another embodiment, as shown in FIG. 6, the UV lamp 118 may be positioned so that its location 148 falls on the working surface 146 of the glass bottle 128 supporting the inked image as disclosed in FIG. 5. In order to reduce the magnitude of the UV radiation falling on surface 146 and the printing screen 134, a partial UV filter 150 such as a tinted Mylar substrate may be interposed therebetween. The UV filter 150 can be preselected to absorb a sufficient amount of UV radiation, yet still allowing for the partial curing of the inked image. Referring to FIG. 7, it is also possible to control the power of the UV lamp by selecting a particular wavelength interval for a particular UV lamp 118. As previously noted, the preferred range of ultraviolet radiation has a wavelength of 325–365 nm. With a wavelength of 351–400 nm, the output power is 662.7 watts. However, by selecting a wavelength interval of 301–350 nm, the output power is reduced to 222.7 watts. It is therefore possible using ultraviolet lamps having different spectral radiance, various power levels at selected wavelengths may be achieved for not only effecting partial cure of the applied inked image, but also selectively curing certain applied inked image colors. It should be appreciated that a number of techniques can be used to minimize the level of incident UV radiation to which the printing screen 134 may be subjected during the screen printing process.

The curing of the applied inked image may be enhanced by raising the surface temperature of the glass bottle 128 prior to the screen printing process. In this regard, an infrared lamp 152 may be positioned at each screen printing workstation 130 in advance of each screen printing head 132 as shown in FIGS. 1 and 2. The infrared lamp 152 will raise the surface temperature of the glass bottle 128 in the range of about 300–350° F.

The radiation curable compositions of the present invention have thus far been described as free radical curing inks curable by various types of radiation, such as electron beam, UV or actinic radiation and the like. It is to be appreciated that non-free radical curing inks such as those which are heat cured may also be employed in accordance with the present invention. In this regard, these heat cured inks include epoxies, polyesters, polyurethanes and the like. When heat cured inks are employed, an infrared lamp 152 or microwave source may be substituted for the UV lamp 118 as thus far described. These heat cured inks are generally not preferred due to their inclusion of VOC's, in particular, in polyurethane based inks. However, one may employ water based inks such as epoxies and the like which are environmentally safe by being free of VOC's and toxic heavy metals.

EXAMPLE 1

The cure rate of UV ink or coatings are dependent on the monomers, the concentration of the different monomers in the formula, initiation systems and the concentration of initiators, as well as the light intensity and wavelength. The necessary UV dose (energy) for curing a given UV curable coating or ink formula is constant in certain conditions. The full cure of a coating film is defined by the reacting of all active groups (acrylate double bonds, vinyl ether double bonds or epoxy functional groups) in the formula. The half cure of the UV coating is defined by formulation of a solid film with tack free surface in which the active functional groups are not completely reacted. The UV dose for such a half cured coating film was detected by a UV radiometer, e.g. the measurement of the same amount of energy used for obtaining tack free surface coating. The unit of half cure UV dose is energy irradiated on unit area (for example mj/cm$^2$). The half cure UV dose for different formula can range from, as low as, 40 mj/cm$^2$ for acrylates system to 1,000 mj/cm$^2$ or more for epoxy, cationic photo initiation system. Following are half cure dose of selected UV coating and inks.

| Coatings | Half Cure Dose (mj/cm$^2$) |
|---|---|
| Acrylate Perfume Barrier Coating | 40 |
| Cyclic Epoxide, Cationic UV Coating (White) | 1,000 |
| Cyclic Epoxide, Cationic UV Coating (Red) | 750 |
| Cyclic Epoxide, Cationic UV Coating (Clear) | 500 |

Figure 8:
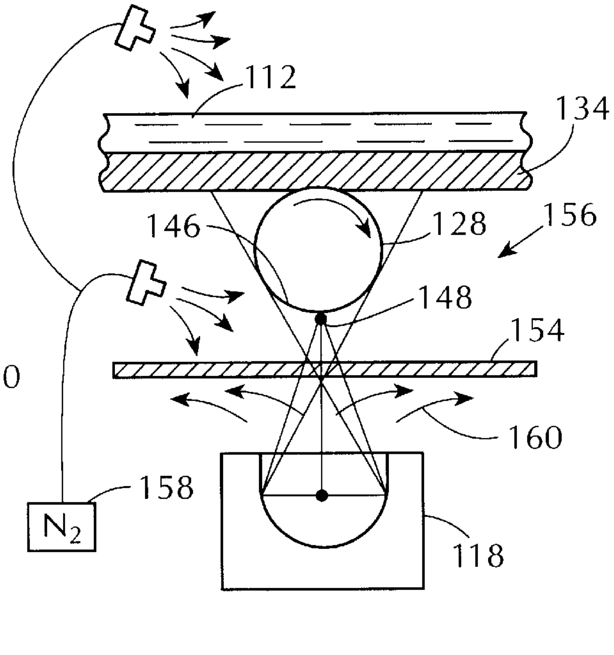
FIG. 8 is a diagrammatic illustration of an arrangement of a UV lamp for effecting partial curing of the screen printed radiation curable material in accordance with another embodiment of the present invention.

The preferred radiation curable compositions of the present invention include cationic UV curing inks as described in the aforementioned applications. However, it is to be understood that anionic UV curable inks may also be employed in accordance with the present invention. However, it is known that anionic UV curable inks will self cure in the presence of oxygen. In using anionic UV curable inks, it is therefore necessary to provide an inert atmosphere for the screen printing process. As shown in FIG. 8, the UV lamp 118 is positioned underlying a UV transparent member 154 which provides a process zone 156 which is bathed with an inert gas such as nitrogen 158. It is also required that the screen printing head 132 be bathed with nitrogen to prevent premature curing of the radiation curable composition 112. In the embodiment shown, the UV transparent member 154 may also double as a partial UV filter to enable arranging the location 148 of maximum power of the UV lamp 118 on the working surface 146 of the glass bottle 128. However, it is to be understood that other arrangements and techniques as previously disclosed and described may also be utilized. Finally, to prevent excessive heating of the UV filter 150 or UV transparent member 154, a supply of cooling air 160 may be supplied from a source (not shown).

Figure 9:
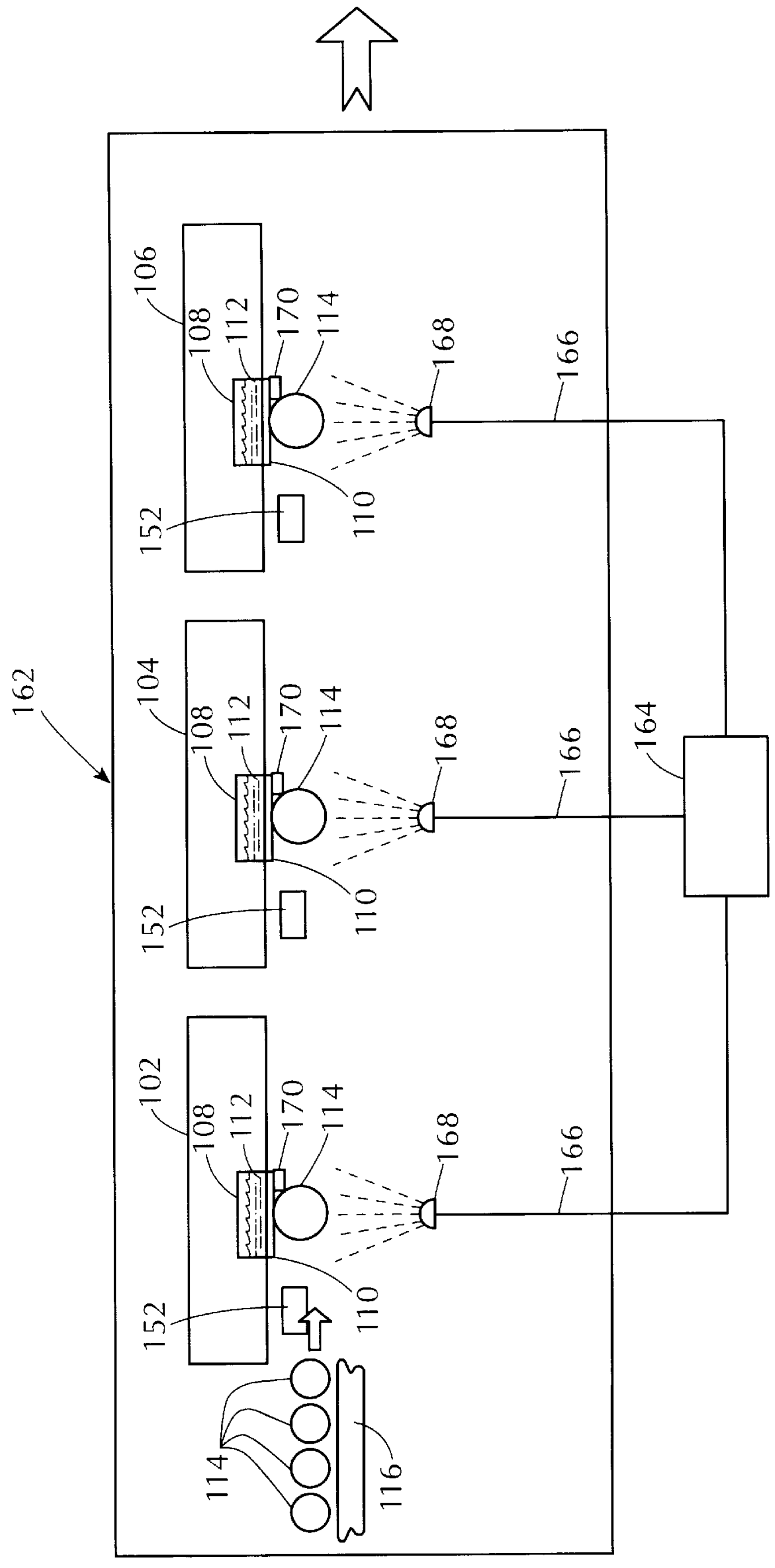
FIG. 9 is a diagrammatic illustration of an apparatus for screen printing UV curable pigmented compositions onto the surface of a substrate in accordance with another embodiment of the present invention wherein the UV radiation source is arranged at a remote location.

Referring now to FIG. 9, there will be described an apparatus 162 constructed in accordance with another embodiment of the present invention. The apparatus 162 is similarly constructed with respect to the apparatus 100 as shown in FIG. 1. However, a UV source 164 is located at a remote location outside the apparatus 162. The UV source 164, for example, may comprise a laser radiation device emitting the appropriate wavelength for curing the applied inked image. The emitted laser radiation may be conducted to each of the screen printing heads 108 by means of a fiber optic bundle 166, a light pipe available from Fusion Technologies, Inc. or the like. The fiber optic bundle 166 terminates at location 168 underlying the article 114 to be decorated. The fiber optic bundle 166 may be divided so as to transmit the UV radiation to each of its designated locations 168 underlying each of the screen printing workstations 102, 104, 106. It is to be understood that the various embodiments as described with respect to FIGS. 4–8 may also be employed with the apparatus 162 using a remotely positioned laser for its UV radiation source 164. The apparatus 162 has been described using a single laser to transmit UV radiation to each of the screen printing heads 108. In addition, a plurality of individual lasers, one for each screen printing workstation 102, 104, 106 may be provided in accordance with the present invention.

In another embodiment of the present invention, it is possible to provide a decorated substrate which has a two-tone effect where a portion of the colored inked image on the article is hot stamped. For example, an article such as a container may be decorated in a predetermined design by silk screening the radiation curable composition on the article and fully curing with electron beam or the appropriate radiation, e.g., UV or actinic. A layer of hot stamping foil is then compressed against the article with a press located outside the screen printing equipment which is heated to a temperature sufficient to cause the hot stamping foil to adhere to the printed inked image but not to the inked free areas of the glass.

Hot stamping foil is generally a laminate comprised of a carrier material (often polyester or a similar material capable of release), a release film between the carrier and a subsequent decorative coat which is usually a color or a metallized coat, most often aluminum or colored aluminum. The foil may contain other optional layers such as one or more protective layers, hot melt adhesive layers, etc. between the metallized layer or layers and the carrier material. More specifically, hot stamping foil can be defined as a multilayer web comprised of a backing film carrier, a release coating, one or more protective top coatings, one or more color coatings, and a hot melt adhesive, in that order.

The hot stamping foil is then compressed against the article with the hot melt adhesive layer being compressed against the substrate. The press, which may be a standard hot stamping press or a hand held press, is heated to a temperature sufficient to cause the hot melt adhesive layer of the hot stamping foil to adhere to the inked decorated portion of the article. Generally this temperature range is about 250–400° F. Temperatures higher than this will cause deterioration of the hot stamping foil or some decomposition of the ink. The application of heat causes the adhesive side of the hot stamping foil to become adhesively adhered to the inked design but not to the inked free areas of the article.

When the press is removed, a portion of the foil laminate adheres to the inked decoration but not to the inked free areas of the glass. In particular, adhered to the colored inked design on the article is the hot melt adhesive layer, the color coatings, and the protective top coatings, in that order, of the hot stamping foil. Portions of the release coating may or may not be adhered to the protective top coating because the release coating is designed to melt upon application of heat and cause the polyester carrier backing layer to release from the protective top coat layer and some remnants may remain. The colored inked design on the article can be fully or partially hot stamped as desired to yield a pleasant two tone metallic/color design.

Although the invention herein has been described with reference to particular embodiments, it is to be understood that the embodiments are merely illustrative of the principles and application of the present invention. For example, a safety switch 170 (see FIG. 1) may be positioned to detect the presence of the glass bottle 114 underlying the screen printing head 108. In the absence of detecting the presence of the glass bottle 114, the UV lamp 118 will be rendered inoperative. This prevents the emission of UV radiation directly on the patterned screen 110 in the absence of a glass bottle 128 which acts as a partial UV filter to prevent setting of the radiation curable composition 112 within the screen printing head 108. It is therefore to be understood that numerous modifications may be made to the embodiments and that other arrangements may be devised without departing from the spirit and scope of the present invention as defined by the claims.

What is claimed is:

1. Apparatus for applying a layer of actinic radiation curable material onto the surface of a glass, plastic, or ceramic article, said apparatus comprising a frame assembly having at least first and second material applying stations, applying means for applying said layer of radiation curable material onto the surface of said article at said first and second stations, actinic radiation emitting means positioned underlying said applying means at said stations for at least partially curing said layer of material thereat such that the article to be decorated is positioned between the radiation emitting means and the applying means; means for conveying said article into operative relationship with said applying means and said radiation emitting means at said first and second stations.

2. The apparatus of claim 1, wherein said actinic radiation emitting means emits UV radiation and comprises a UV radiation emitting source positioned underlying and opposing said applying means.

3. The apparatus of claim 1, wherein said actinic radiation emitting means emits UV radiation and comprises a laser UV radiation emitting source located remote from said applying means, and means for conveying the UV radiation to said location underlying said applying means such that the article to be decorated is positioned between the UV radiation emitting source and the applying means.

4. The apparatus of claim 1, wherein said radiation emitting means emits UV radiation.

5. The apparatus of claim 4, further including a partial UV filter disposed between said article and said radiation emitting means.

6. The apparatus of claim 1, wherein said radiation emitting means has its location of maximum power located distant from said applying means.

7. The apparatus of claim 1, further including means for maintaining said article underlying and opposing said applying means in an inert atmosphere.

8. The apparatus of claim 1, further including means for heating the surface of said article adjacent said applying means.

9. In an apparatus for screen printing a glass plastic, or ceramic article with a layer of actinic radiation curable material, said apparatus including a plurality of screen printing workstations each having a screen printing assembly for applying said radiation curable material to said article, wherein the improvement comprises actinic radiation emitting means positioned underlying the screen printing assemblies for at least partially curing the radiation curable material applied to said article such that the article to be decorated is positioned between the radiation emitting means and the screen printing assembly.

10. The apparatus of claim 9, wherein said actinic radiation emitting means comprises a UV radiation emitting source positioned underlying and opposing said screen printing assembly such that the article to be decorated is positioned between the UV radiation emitting means and the screen printing assembly.

11. The apparatus of claim 9, wherein said actinic radiation emitting means comprises a laser UV radiation emitting source located remote from said screen printing assemblies, and means for conveying the UV radiation to a location underlying the screen printing assemblies such that the article to be decorated is positioned between the UV radiation emitting means and the screen printing assembly.

12. The apparatus of claim 9, wherein said radiation emitting means has its location of maximum power located distant from said screen printing assembly.

13. Apparatus for applying a layer of actinic radiation curable material onto the surface of a glass, plastic, or ceramic article, said apparatus comprising a frame assembly having at least first and second material applying stations, applying means for applying said layer of radiation curable material onto the surface of said article at said first and second stations, actinic radiation emitting means for at least partially curing said layer of material positioned at a remote location from said applying means, conducting means for conducting radiation emitted from said actinic radiation emitting means to said stations adjacent said applying means, and means for conveying said article into operative relationship with said applying means and said radiation emitted from said actinic radiation emitting means at said first and second stations.

14. The apparatus of claim 13, wherein said actinic radiation emitting means comprises a UV radiation emitting source.

15. The apparatus of claim 13, wherein said radiation emitting means emits UV radiation.

16. The apparatus of claim 15, further including a partial UV filter disposed between said article and said radiation emitting means.

17. The apparatus of claim 13, wherein said radiation emitting means has its location of maximum power located distant from said applying means.

18. The apparatus of claim 13, wherein said conducting means conducts said radiation from said source to said stations underlying and opposing said applying means.

19. Apparatus for screen printing multiple layers of a UV curable composition onto the surface of a glass, plastic, or ceramic article, said apparatus comprising a frame assembly having a plurality of screen printing workstations, a screen printing assembly located at each of said workstations for applying a layer of said composition to the surface of said article, at least one layer of said composition applied at least partially overlying another layer of said composition, UV radiation emitting means positioned underlying each of said screen printing assembly for exposing said layer of said composition to sufficient UV radiation for at least partially curing said composition such that the article to be decorated is positioned between the UV radiation emitting means and the screen printing assembly, and means for conveying said article into operative association with the screen printing assemblies and said UV radiation.

20. The apparatus of claim 19, wherein said UV radiation emitting means comprises a UV lamp.

21. The apparatus of claim 19, wherein said radiation emitting means comprises a laser UV radiation emitting source located remote from said screen printing assemblies, and conveying means for conveying the UV radiation to a location underlying and opposing said screen printing assemblies.

22. The apparatus of claim 19, wherein said conveying means comprises a light pipe.

23. The apparatus of claim 19, wherein said radiation emitting means has its location of maximum power located distant from said screen printing assembly.

24. Apparatus for applying a layer of actinic radiation curable material onto the surface of a glass, plastic, or ceramic article, said apparatus comprising a frame assembly having at least first and second material applying stations, applying means for applying a layer of said radiation curable material onto the surface of said article at said first and second stations, actinic, radiation emitting means positioned adjacent said applying means at said stations for at least partially curing said layer of material thereat and insufficient to cure said radiation curable material within said applying means, and means for conveying said article into operative relationship with said applying means and said radiation emitting means at said first and second stations.

25. The apparatus of claim 24, wherein said radiation emitting means has its location of maximum power located distant from said applying means.

26. The apparatus of claim 24, wherein said radiation emitting means has an output power sufficient only to partially cure said layer of material.

27. The apparatus of claim 24, wherein said conveying means is operative for exposing said layer of material to said radiation emitting means for a period sufficient to only partially cure said material.

28. The apparatus of claim 24, wherein said radiation emitting means is positioned underlying and opposing said applying means.

29. The apparatus of claim 28, wherein said radiation emitting means comprises a UV radiation emitting source.

30. Method of applying a layer of actinic, radiation curable material onto the surface of a glass, plastic, or ceramic article, said method comprising conveying said article through a plurality of printing workstations, applying said layer of radiation curable material onto the surface of said article at each of said workstations, and exposing said applied layer to actinic, radiation sufficient to at least partially cure said applied layer at a location underlying said printing workstation.

31. The method of claim 30, wherein said actinic radiation curable material comprises UV radiation curable material.

32. The method of claim 30, further including arranging a source of said radiation at a location whereby the maximum power of said source is located distant from the adjacent surface of said article.

33. The method of claim 30, wherein said radiation incident on said applied layer comprises about 40 to 1000 $mj/cm^2$.

34. The method of claim 30, further including maintaining said applied layer at a location underlying and opposing said printing workstations in an inert atmosphere.

35. The method of claim 30, further including heating the surface of said article prior to applying said radiation curable material.

36. The method of claim 30, wherein said radiation is UV electron beam radiation.

37. The method of claim 30, wherein said radiation is emitted from a source at a location remote from said printing stations and conveyed thereto by a device selected from the group consisting of a fiber optic bundle and a light pipe.

38. The method of claim 30, further including controlling the power of a source of said radiation to only cure said applied layer and insufficient to cure said radiation curable material within said workstations.

39. The method of claim 30, further including controlling the exposure time of said applied layer to said radiation to only partially cure said layer and insufficient to cure said radiation curable material within said workstations.

40. The method of claim 30, wherein said article comprises a glass bottle.

41. The method of claim 30, wherein said article comprises a plastic bottle.

42. Method of printing multiple layers of a UV curable composition onto the surface of a glass, plastic, or ceramic article said method comprising conveying said article through a plurality of printing workstations, applying a layer of said composition onto the surface of said article at each of said workstations, at least one layer being applied partially overlapping a previously applied layer, exposing at least said previously applied layer at a location underlying its corresponding printing workstation to sufficient UV radiation to at least partially curing said previously applied layer and insufficient to cure said UV curable composition within said workstations.

43. The method of claim 42, further including heating the surface of said article prior to applying said radiation curable material.

44. The method of claim 42, further including arranging a source of said radiation at a location whereby the maximum power of said source is located distant from the adjacent surface of said article.

45. The method of claim 42, wherein said radiation incident on said applied layer comprises about 40 to 1000 $mj/cm^2$.

46. The method of claim 42, further including maintaining said applied layer at a location underlying and opposing said printing workstations in an inert atmosphere.

47. The method of claim 42, wherein said composition is a cationic curable UV composition.

48. The method of claim 42, further including controlling the power of a source of said radiation to only partially cure said applied layer.

49. The method of claim 42, further including heating the surface of said article prior to applying said radiation curable material.

50. The method of claim 42, wherein said applied layer is half cured.

51. The method of claim 42, wherein said article comprises a glass bottle.

52. The method of claim 42, wherein said article comprises a plastic bottle.

* * * * *